United States Patent [19]

Torii et al.

[11] Patent Number: 4,741,407

[45] Date of Patent: May 3, 1988

[54] METHOD AND SYSTEM FOR CONTROLLING LIMITED-SLIP DIFFERENTIAL GEAR UNIT FOR AUTOMOTIVE VEHICLE

[75] Inventors: Shuuji Torii, Yokohama; Kiyotaka Ozaki, Yokosuka; Masatsugu Owada, Yokohama, all of Japan

[73] Assignee: Nissan Motor Company, Limited, Yokohama, Japan

[21] Appl. No.: 927,397

[22] Filed: Nov. 6, 1986

[30] Foreign Application Priority Data

Nov. 8, 1985 [JP] Japan ................... 60-250423

[51] Int. Cl.⁴ ........................................... B60K 17/16
[52] U.S. Cl. ....................................... 180/76; 74/650; 74/710; 74/710.5; 180/248; 192/87.13; 192/87.18
[58] Field of Search ............ 180/76, 248; 74/650, 74/710, 710.5, 711; 192/87.13, 87.18

[56] References Cited

U.S. PATENT DOCUMENTS

| | | | |
|---|---|---|---|
| 4,549,448 | 10/1985 | Kittle | 74/710.5 |
| 4,583,424 | 4/1986 | Von Hiddessen et al. | 74/710.5 |
| 4,586,728 | 5/1986 | Tokunaga et al. | 280/707 |
| 4,600,215 | 7/1986 | Kuroki et al. | 280/707 |

OTHER PUBLICATIONS

Jidosha Kogaku Zensho, "Power Train Device", vol. No. 9, Nov. 15, 1980, pp. 321–324.
Jidosha Kogaku, vol. 33, No. 10, Oct. 1, 1984, pp. 38–55.

Primary Examiner—Kenneth R. Rice
Attorney, Agent, or Firm—Schwartz, Jeffery, Schwaab, Mack, Blumenthal & Evans

[57] ABSTRACT

A limited-slip differential gear unit has end adjustable slip-limitation according to the operation mode of the adjustable suspension system. A control system for the limited-slip differential gear unit, which controls the slip-limitation is associated with a suspension control system to receive therefrom a suspension mode indicative signal to select one of a plurality of preset characteristics to derive a slip-limit control signal. The limited-slip differential gear unit includes a slip-limit adjusting mechanism which is responsive to the control signal for adjusting the slip-limitation to be generated by the limited-slip differential gear unit.

14 Claims, 3 Drawing Sheets

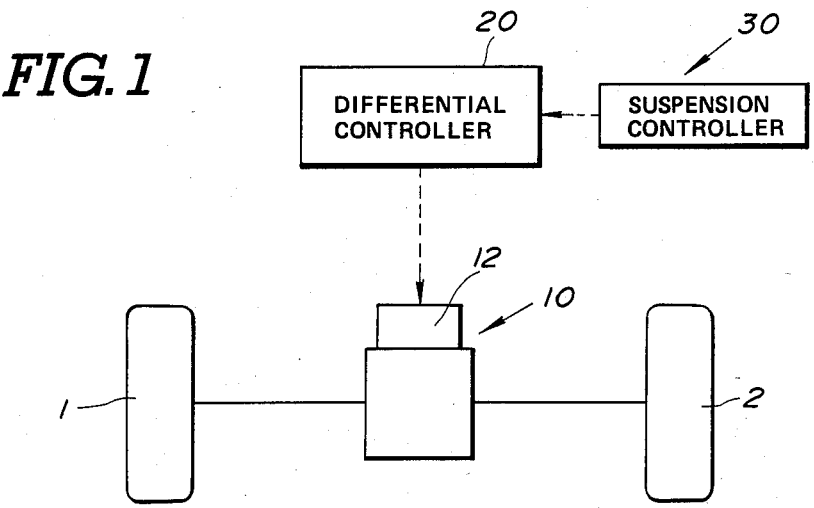
FIG. 1
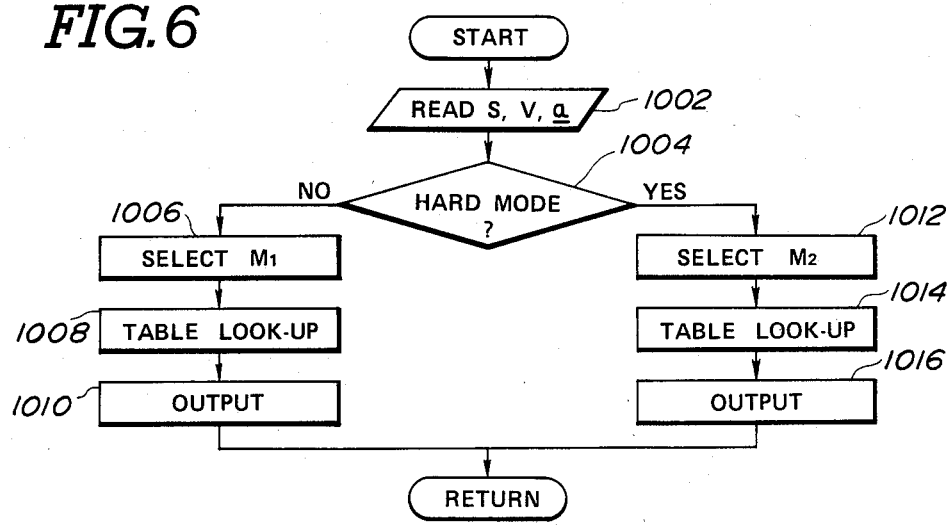
FIG. 5a
FIG. 5b
FIG. 6

METHOD AND SYSTEM FOR CONTROLLING LIMITED-SLIP DIFFERENTIAL GEAR UNIT FOR AUTOMOTIVE VEHICLE

BACKGROUND OF THE INVENTION

1. Field of the Invention

The present invention relates generally to a limited-slip differential gear unit for an automotive vehicle. More particularly, the invention relates to a method and system for adjusting slip limitation in a limited-slip differential gear unit. Further particularly, the invention relates to adjustment of slip-limitation for a limited-slip differential gear unit depending upon a vehicle driving condition.

2. Description of the Background Art

A convention limited-slip differential gear unit has been disclosed in "Jidosha Kogaku Zensho" Vol. No. 9, "Power Train Device", published on Nov. 15, 1980, by Kabushiki Kaisha Sankaido, on pages 321 to 324, for example.

Such a conventional limited-slip differential gear unit employs a slip-limiting mechanism which comprises multi-plate friction clutches. The multi-plate friction clutches are interposed between a differential casing and side gears. For the multi-plate friction clutch, a thrusting force generated by a cam mechanism provided on a pinion mate shaft depending upon driving torque, is applied as a clutch engaging force. According to the clutch engaging force thus generated, a slip-limiting torque is generated by the slip-limiting mechanism. Such types of slip-limiting mechanism have been known as "torque-proportional type slip-limiting mechanisms".

On the other hand, there have been proposed an automotive suspension system which has a variable suspension characteristics such as a damping characteristics. An example of such an adjustable suspension system has been discussed in "Jidosha Kogaku" Vol. 33, No. 10, published on Oct. 1, 1984, by Kabushiki Kaisha Tetsudo Nihonsha, on pages 38 to 55. The disclosed suspension system employs a variable damping force damper which allows adjustment of damping characteristics depending upon vehicle driving conditions or so forth so as to provide both riding comfort and driving stability. In general, softer damping characteristics is selected on city roads for providing better riding comfort. On the other hand, harder damping characteristics is selected while the vehicle is running at high speed so as to provide higher driving stability.

Such conventional limited-slip differential gear units and the adjustable suspension characteristics suspension systems can provide better vehicular driving performance when they are observed independently. For instance, the limited-slip differential gear unit may distribute higher driving torque for higher load wheel by limiting slip at the lower load wheel. On the other hand, the adjustable suspension may achieve both riding comfort and driving stability as set forth above. However, when both the limited-slip differential gear unit and the adjustable suspension system are both applied on a vehicle, problems arise depending on the operation modes of the vehicle. Namely, by adjustment of the suspension characteristics, not only the vehicle body behavior but also load conditions on the wheels may be changed to cause variation of the required driving torque. For example, when a softer suspension mode is selected, limiting of the slip in the differential gear unit tends to become excessive to cause too quick vehicular a response to maintain driving comfort. Furthermore, excessive driving torque on the lighter load wheel may results in degradation of fuel economy. On the other hand, when the softer suspension characteristics is selected, the slip-limiting effect occurs with a certain delay time from the occurence of vehicular rolling. This causes abrupt change of driving characteristics to degrade driveability. Namely, when softer a suspension is selected, though the overall magnitude of vehicle rolling is relatively large, the shifting of the gravity center occurs modelately. Therefore, wheel slip at the inner wheel occurs with a delay time after occurence of vehicular rolling. Since the slip-limitation in the limited-slip differential gear unit becomes effective in response to occurence of the wheel slip, delay time of occurence of the slip-limitation corresponds to delay time of occurence of the wheel slip after vehicular rolling.

On the other hand, when a harder suspension characteristics is selected during high speed crusing, lateral slip of the rear portion of the vehicle tends to occur when slip-limitation is not sufficient.

SUMMARY OF THE INVENTION

Therefore, it is an object of the invention to solve the aforementioned drawback which occurs when a limited-slip differential gear unit is placed on an automotive vehicle having an adjustable suspension system.

Another object of the invention is to provide a limited-slip differential gear unit which is adjustable of slip-limitation according to the operation mode in the adjustable suspension system.

In order to accomplish the aforementioned and other objects, of the invention there is provided, according to the present invention, a control system for a limited-slip differential gear unit, which controls slip-limitation. The control system is associated with a suspension control system to receive therefrom a suspension mode indicative signal to derive a slip-limit control signal. The limited-slip differential gear unit includes a slip-limit adjusting mechanism which is responsive to the control signal for adjusting the slip-limitation to be generated by the limited-slip differential gear unit.

In practice, the slip-limit adjusting mechanism comprises a hydraulically adjustable friction clutch having adjustable engaging pressure by adjusting a working fluid pressure. A pressure control valve means is interposed between a fluid pressure source and the friction clutch for adjusting the engaging pressure at the friction clutch according to the aforementioned control signal.

According to one aspect of the invention, a slip-limit control system for a limited-slip differential gear unit, comprises a slip-limit adjusting means, incorporated in the limited-slip differential gear unit, for producing a controlled magnitude of slip-limiting torque according to a differential control signal so as to adjust driving torque distribution for left and right wheels, a first sensor means for monitoring vehicle driving conditions to produce a first sensor signal indicative of a preselected slip control parameter, a second sensor for an operation mode of an adjustable suspension system which has a variable suspension characteristics, to produce a second sensor signal indicative of the suspension mode, and a controller responsive to the first sensor signal to derive the differential control signal based thereon according to a differential control characteristics, and the controller being responsive to the second sensor signal to select one of a plurality of preset differential control characteristics depending upon the mode position of the adjustable suspension system.

Preferably, the adjustable suspension system has a variable suspension characteristics at least between a HARD and a SOFT mode, and the controller selects a first differential control characteristics when the adjustable suspension system operates in the HARD mode and selects a second differential control characteristics in a which lower slip-limitation is provided than that in the first differential control characteristics, when the adjustable suspension system operates in the SOFT mode.

In a practical construction, the slip-limit adjusting means comprises a hydraulic clutch assembly adjustable in engaging pressure and a hydraulic actuator associated with the hydraulic clutch for adjusting the engaging pressure for controlling the slip-limiting torque. The hydraulic clutch assembly comprises a first clutch interposed between an input shaft of the limited-slip differential gear unit and a first output shaft for driving the left wheel and a second clutch interposed between the input shaft and a second output shaft for driving the right wheel, and the first and second clutches are respectively cooperated with the hydraulic actuator to be adjusted the engaging pressure. The hydraulic actuator comprises a piston exerting pressure for the first and second clutches for establishing the engaging pressure and a valve means for adjusting fluid pressure exerted on the piston, which valve means adjusts the fluid pressure according to the differential control signal. The valve means is connected to a fluid pressure source including a fluid pump which is controlled by operation by the controller. The fluid pump is controlled to be driven only in a predetermined vehicle driving condition which requires differential operation.

In the preferred embodiment, the first sensor monitors a vehicle speed and produces a vehicle speed indicative first sensor signal, and the controller derives the differential control signal based on the vehicle speed indicative first sensor signal value. The first sensor also monitors an accelerator position and produces an accelerator position indicative first sensor signal, and the controller derives the differential control signal based on the vehicle speed indicative first sensor signal and the accelerator position indicative first sensor signal.

According to another aspect of the invention, a method for controlling slip-limitation for the limited-slip differential gear unit comprising the steps of:

providing a slip-limit adjusting means in the limited-slip differential gear unit for producing a slip-limiting torque for adjusting driving torque distribution for associated left and right wheels;

monitoring preselected differential control parameter for producing a first signal indicative thereof;

detecting an operation mode of an adjustable suspension system for producing a suspension mode indicative second signal;

selecting one of a plurality of mutually different preset differential control characteristics based on the second signal; and deriving a differential control signal according to a given differential control characteristics based on the first signal, for controlling the slip-limit adjusting means.

BRIEF DESCRIPTION OF THE DRAWINGS

In the drawings:

FIG. 1 is a schematic block diagram of the preferred embodiment of a limited-slip differential gear unit according to the present invention, which is associated with a suspension control system;

FIGS. 5(A) and 5(B) show lock-up tables for deriving control signal in relation to an throttle valve angular position and a vehicle speed; and FIG. 6 is a flowchart of a slip-limit control program to be executed by a controller in the control system of FIG. 4.

DESCRIPTION OF THE PREFERRED EMBODIMENT

Figure 2:
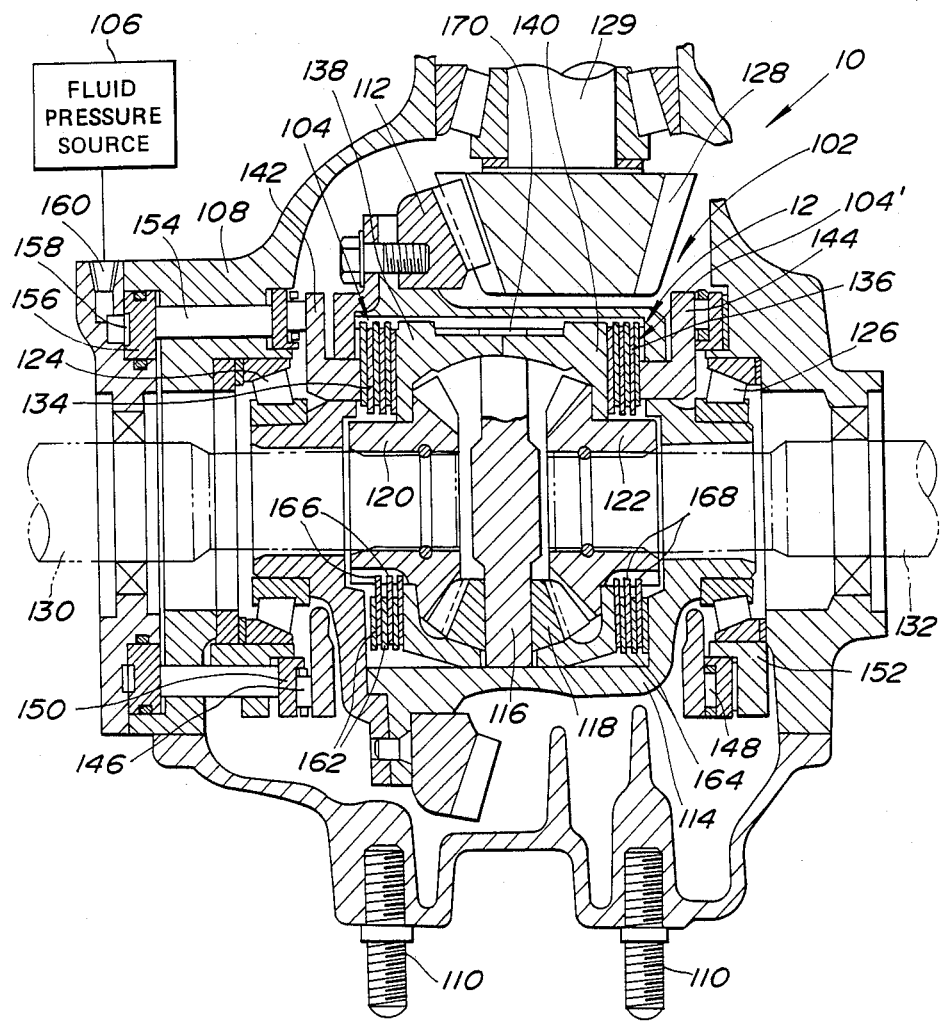
FIG. 2 is a sectional view of the limited-slip differential gear unit of FIG. 1.

Referring now to the drawings, particularly to FIG. 1, there is the illustrated general and fundamental concept of the preferred embodiment of a limited-slip differential gear unit control system according to the invention. As is well known, driving torque from an automotive engine (not shown) is transmitted through a power train including a differential gear unit 10 to left anf right wheels 1 and 2. The differencial gear unit 10 comprises a limited-slip differential gear unit which can limit the proportion of distribution of driving torque at the left and right wheels 1 and 2. The preferred embodiment of the limited-slip differential gear unit 10 employs a slip control unit 12 for controlling a slip-limitation in the limited-slip differential gear unit. The slip control unit 12 is connected to a differential controller 20. The differential controller 20 adjusts slip-limitation in the limited-slip differential gear unit 10 based on preselected differential control parameters.

The differential controller 20 is responsive to an adjustable the suspension system operation mode as one of the preselected differential control paramters for adjusting slip-limitation according to the mode position of an adjustable suspension system 30. In practice, the differential controller 20 produces a differential control signal producing a lower slip-limitation when the adjustable suspension system operates in a softer suspension mode. On the other hand, the differential controller 20 produces the differential control signal producing a higher slip-limitation when the adjustable suspension system operates in a harder suspension mode.

It should be appreciated that the word "slip-limitation" used throughout the disclosure means a limitation of the difference of driving torque distribution for left and right wheels. "Lower slip-limitation" means a smaller limitation for the difference of driving torque distribution to allow a greater difference. "Higher slip-limitation" means a greater limitation for the difference of driving torque distribution to allow a smaller difference. As will be appreciated, when the limited-slip differential gear unit operates in lower slip-limitation mode, the driving torque to be distributed to the lighter load wheel becomes smaller than that in the higher slip-limitation mode.

Details of the preferred embodiment of the control system for the limited-slip differential gear unit will be disclosed hereafter with reference to FIGS. 2 to 6.

FIG. 2 shows the construction of the preferred embodiment of the limited-slip differential gear unit according to the invention, which includes the slip control unit 12. The limited-slip differential gear unit 10 generally comprises a differential gear assembly 102, multi-plate friction clutches 104 and 104' which generally serves as the slip control unit 12, a working fluid pressure source 106, and the differential controller 20. As is well known, the differential gear assembly 102 allows left and right wheels 1 and 2 to rotate at different rotation speed when load distribution at the left and right wheels is different. On the other hand, when the load exerted at both of left and right wheels is even, the differential gear assembly 102 distributes even driving torque to the left and right wheels to rotate them at the same speed.

The differential gear assembly 102 is housed within a unit housing 108. The unit housing 108 is fixedly secuted to a vehicle body (not shown) by means of stud bolts 110. The differential gear assembly 102 has per se known construction comprising a ring gear 112, a differential casing 114, a pinion mate shaft 116, a differential pinion 118 and side gears 120 and 122. The differential casing 114 is rotatable supported for rotation about the unit housing 108 via tapered roller bearings 124 and 126. The ring gear 112 is fixed to the differential casing 114 and meshed with a drive pinion 128 which is fixedly mounted on a propeller shaft 128. As is well known, the propeller shaft 129 constitute part of a power train for transmitting output torque of a power transmission (not shown) to the differential gear assembly 102. Therefore, the propeller shaft 129 serves as an input shaft for the preferred embodiment of the limited-slip differential gear unit 10. In the shown embodiment, the side gear 120 is fixed to a drive shaft 130 for driving the left wheel 1. Similarly, the side gear 122 is fixed to a drive shaft 132 for driving the right wheel 2. These drive shafts 130 and 132 serve as output shaft of the preferred embodiment of the limited-slip differential gear unit 10.

Figure 3:
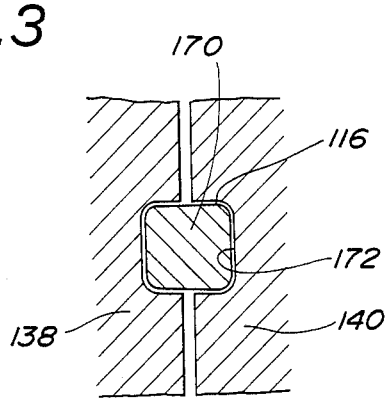
FIG. 3 is an enlarged section of the major part of the limited-slip differential gear unit of FIG. 2.

The multi-plate friction clutches 104 and 104' are interposed between the propeller shaft 129 as the input shaft and the drive shafts 130 and 132 as the output shafts. The engaging pressure of the multi-plate clutches 104 and 10' are controlled by means of an external hydraulic pressure control circuit. Depending upon the engaging pressure exerted on the multi-plate friction clutch 104, the slip-limiting torque of the limited-slip differential gear unit 10 can be adjusted. The multi-plate friction clutches 104 and 104' are housed within the differential casing 114 and comprises a left clutch 134 and a right clutch 136. The left and right clutches 134 and 136 have pressure rings 138 and 140, reaction plates 142 and 144, thrust bearings 146 and 148, and spacers 150 and 152, respectively. The multi-plate friction clutches 104 and 104' further comprise a push rod 154, a pressure piston 156, pressure chamber 158 and port 160. The left clutch 134 and the right clutch 136 respectively have friction plates 162 and 164 rotatable with the propeller shaft 129, and friction disks 166 and 168 rotatable with the side gears 120 and 122. The pressure rings 138 and 140 and the reaction plates 142 and 144 are arranged at axial ends of the left and right clutches 134 and 136. The pressure rings 138 and 140 are connected to the pinion mate shaft 116. As shown in FIG. 3, the end sections 170 of the pinion mate shaft 116 are formed in essentially square-shaped configuration. On the other had, square openings 172 are defined at the mating ends of the pressure rings 138 and 140. With this construction, the thrusting force will be adjusted by engaging pressure of the muti-plate friction clutch 104.

The pressure piston 156 has a surface opposing the pressure chamber 158 to subject working fluid pressure therein. The fluid pressure is introduced into the pressure chamber 158 through the port 160. The pressure piston 156 thrustingly shifts depending upon the fluid pressure in the pressure chamber so as to adjusts engating pressure of the left and right clutches 134 and 136. The engaging pressure exerted from the pressure piston 156 is transmitted through the pusher rod 154, spacer 150 and thrust bearing 146 of the reaction plate 142. Therefore, friction plates 162 and friction disks 166 are engaged with the engaging pressure. At this time, the pressure ring 138 serves for providing reaction force against the engaging pressure from the pressure piston 156. On the other hand, the engaging pressure is transmitted to establish engagement between the friction plates 164 and the friction disks 168. At this time, the reaction force is provided from the peripheral wall of the unit housing 108.

Figure 4:
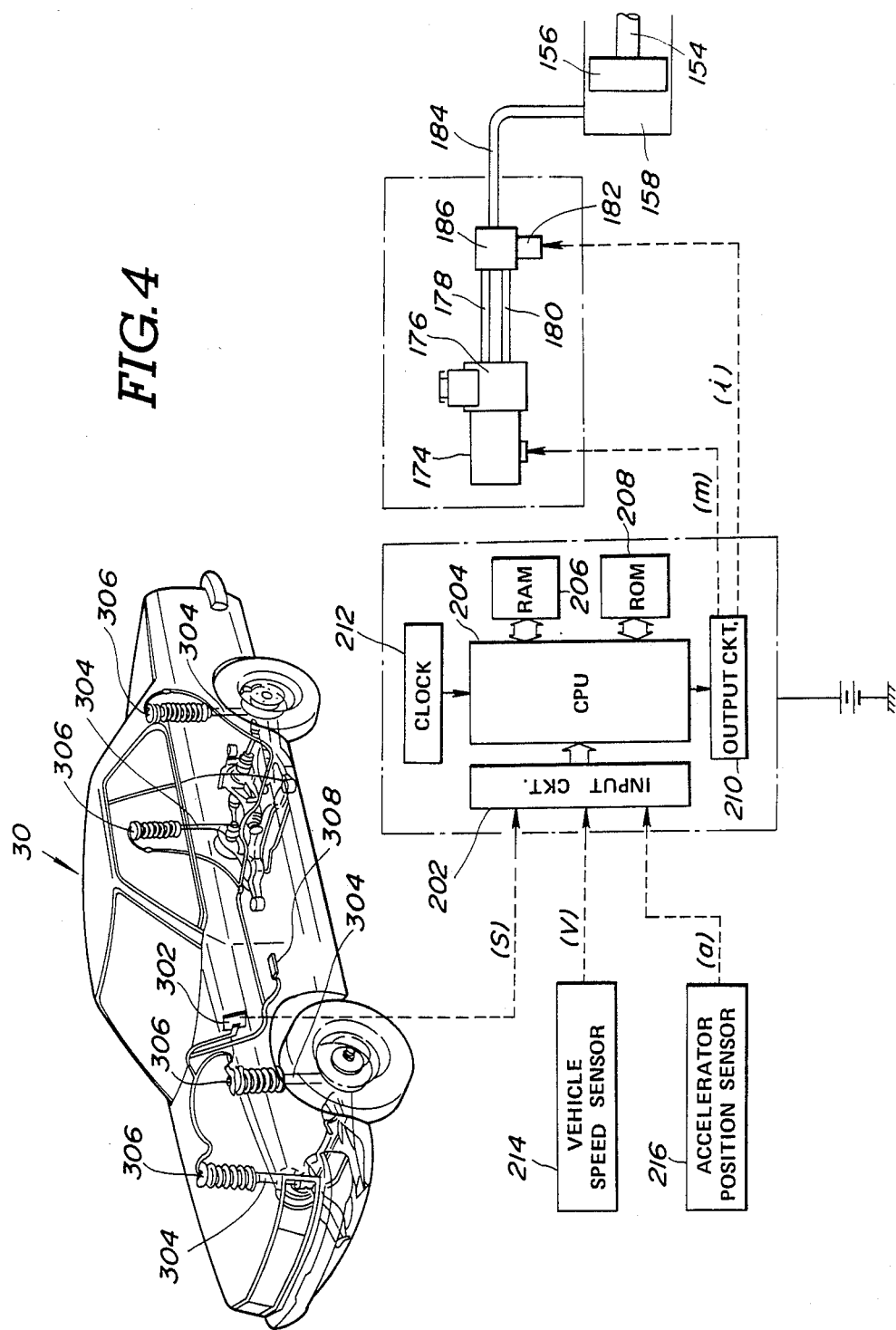
FIG. 4 is a block diagram of the preferred embodiment of the preferred embodiment of a control system for the limited-slip differential gear unit of FIG. 2.

As shown in FIG. 4, the fluid pressure source 106 comprises a pressure pump 176, a pump motor 174, a pressurized fluid passage 178, a drain passage 180 and a control pressure line 184. Between the pressurized fluid passage 178 and the control pressure line 184, a electro-magnetic proportioning pressure reduction valve 186 is provided. The drain passage 180 connects the pressure reduction valve 186 to the pressure pump 174 to recirculate the exessive pressure to the pressure pump.

The pump motor 174 is controlled by a motor control signal m from the differential controller 20. Namely, the pump motor 174 is driven while the limited-slip differential gear unit 10 is in operation to distribute different proportions of the driving torque or while the vehicle driving condition is judged to have a high possibility to require differential operation. On the other hand, the pump motor 174 is held inoperative while the vehicle driving condition is judges to have no need for the differential operation, such as the vehicle resting condition. Therefore, the motor control signal m from the differential controller 20 serves for activating and deactivating the pump motor 174.

The pressure reduction valve 186 is also connected to the differential controller 20 to receive therefrom a pressure control signal i. The pressure control signal i has an electric current value I variable depending upon the required engaging pressure as derived by the differential controller 20. The pressure reduction valve 186 adjusts the working fluid pressure to be distributed through the control pressure line 182 to increase the control pressure proportional to increasing of the electric current I of the pressure control signal i. In order to adjust the fluid pressure in the control pressure line 184, a valve actuator 182 is provided in the pressure reduction valve 186 to control the valve position in response to the pressure control signal i. Therefore, the controlled pressure is introduced into the pressure chamber 158 of the limited-slip differential gear unit 10 via the control pressure line 182 and the port 160.

Here, the control pressure P distributed through the pressure reduction valve 186 and the slip-limiting torque T created in the multi-plate friction clutch 104 is described by the following formula:

$$T \alpha P \times \mu \times n \times r \times A$$

where
$\mu$ is a friction coefficient between the friction plate and friction disk;

n is a number of sets of friction plate and friction disk;
r is an average radius of the clutch; and
A is a pressure receiving area of the clutch.

As will be appreciated herefrom, the slip-limiting torque T to be created by the multi-plate friction clutch 104 varies proportionally to the control pressure from the pressure reduction valve 186.

In order to control the operation of the pressure reduction valve 186, the differential controller 20 generally comprises a microprocessor including an input interface 202, CPU 204, RAM 206, ROM 208 and output interface 210. In addition, the microprocessor as the differential controller 20 includes a clock generator 212 for generating clock pulse. The input interface 202 of the differential controller 20 is connected to a vehicle speed sensor 214 and an accelerator angle sensor 216. The input unit 302 in the aforementioned adjustable suspension system 30.

As seen from FIG. 4, the adjustable suspension system 30 includes variable dampers 304, each of which incorporates an actuator 306. The actuators 306 of the variable dampers 304 are controlled by a suspension control signal produced by the suspension control unit 302. The variable damper 304 adjust the damping characteristics at least between a HARD mode and a SOFT mode by means of the actuator 306. The suspension control unit 302 derives the suspension control signal based on preselected suspension control parameters, such as vehicle speed, acceleration and deceleration of the vehicle, vehicular rolling, road roughness and so forth. Derivation of the suspension control signal has been disclosed in U.S. Pat. No. 4,600,215, issued on July 15, 1986, European Patent First Publications Nos. 01 35 902, 01 45 013, 01 51 421 and so forth. The disclosure of the above-identified prior publications are herein incorporated by reference for the sake of disclosure.

In addition, the adjustable suspension system may include a manual mode selector switch 308 for selecting a suspension mode between a HARD mode and a SOFT mode. The manual switch 308 may further have an AUTO mode for automatically select the suspension modes, i.e. HARD and SOFT modes. The suspension control unit 302 outputs the suspension control signal indicative of the required suspension mode.

ROM 208 stores a differential control program which is shown in FIG. 6 and will be discussed later. CPU 204 executes the differential control program in ROM 208 is response to a vehicle speed indicative signal v from the vehicle speed sensor 214, an accelerator position indicative signal a from the accelerator angle sensor 216 and a suspension mode indicative signal s from the suspension control unit. As will be appreciated, the suspension control signal derived by the suspension control unit may be taken as the suspension mode indicative signal s in the differential controller 20.

However, in case that the adjustable suspension system 30 does not have the AUTO mode for automatically selecting the suspension mode and allows only manual mode selection through the manual mode selector switch 308, the mode selection signal from the manual mode selector switch 308 is taken as the suspension mode indicative signal s. On the other hand, the accelerator angle sensor 216 may be replaced with a throttle valve angle sensor for monitoring a throttle valve angular position.

According to the preferred embodiment, the limited-slip differential gear unit control system, adjusts the slip-limitation generally based on the vehicle speed and the accelerator angular position utilizing a table look-up. Therefore, a look-up table is stored in ROM 208 so as to permit table look-up with respect to vehicle speed as indicated by the vehicle speed indicative signal v and the accelerator angular position as indicated by the accelerator position indicative signal a. In order to vary the differential control characteristics depending upon the suspension mode as indicated by the suspension mode indicative signal s, the look-up table stored in ROM 208 is separated into a first table $M_1$ (FIG. 5A) and a second table $M_2$ (FIG. 5B). The first table $M_1$ is selected when the suspension is in a SOFT mode and the second table $M_2$ is selected when the suspension is in a HARD mode. As seen from FIG. 5, the control circuit I of the differential control signal to be derived based on the first table $M_1$ is smaller than that in the second table $M_2$. As set forth, the engaging torque of the multi-plate friction clutch 104 is variable proportionally to the control current value I and the slip-limitation increases to be higher with increasing of the engaging pressure.

FIG. 6 shows the flowchart of the differential control program to be executed by CPU 204 of the differential controller 20. The differential control program of FIG. 6 may be triggered at given intervals, e.g. every 10 to 20 sec. As soon as the differential control program is triggered, the vehicle speed indicative signal value V which represents the vehicle speed, the accelerator position indicative signal value a and the suspension mode indicative signal value S are read out at a step 1002. Thereafter, at a step 1004, the suspension mode indicative signal value S is checked to see whether it indicates the HARD suspension mode or not. In practice, the suspension mode indicative signal value varies between HIGH and LOW to respectively indicate HARD mode and SOFT mode of the suspension system when the adjustable suspension system operates in a two-way mode.

When the HARD mode of the suspension system is not detected at the step 1004, the second look-up table $M_1$ in ROM 208 is accessed at a step 1006. At a step 1008, table loop-up is performed with respect to the vehicle speed indicative signal value V and the accelerator position indicative value a to derive the differential control signal value. The differential control signal is then output to adjust the engaging pressure of the multi-plate friction clutch 104 for adjustment of driving torque distribution, at a step 1010.

On the other hand, when the Hard mode of the suspension system is detected at the step 1004, the first look-up table $M_2$ in ROM 208 is accessed at a step 1012. At a step 1014, table loop-up is performed with respect to the vehicle speed indicative signal value V and the accelerator position indicative value a to derive the differential control signal value. The differential control signal is then output to adjust the engaging pressure of the multi-plate friction clutch 104 for adjustment of driving torque distribution at a step 1016.

It should be appreciated that the present invention is applicable not only for the combination of the limited-slip differential gear unit and the two-way adjustable suspension system but also for the combination of the limited-slip differential gear unit and multi-stage (more than two) adjustable suspension systems. In the latter case, more than two look-up tables, the number of which corresponds to number of modes of the adjustable suspension system, may be provided so that the differential control characteristics may be variable depending upon the mode position of the adjustable suspension system.

It should be further appreciated that the present invention is also applicable for slip-limit control systems for the limited-slip differential gear unit set out in the pending Japanese Patent Applications Nos. 59-187780, 59-187781, 60-191270, 60-157837 and so forth. The disclosure of the above-identified prior and co-pending Japanese Patent applciations are incorporated by reference for the sake of disclosure.

Furtherore, the working fluid pressure in the pressure chamber can be controlled by any suitable means. Therfore, the pressure reduction valve 186 can be replaced with any suitable fluid pressure adjusting means. For instance, if desired, the fluid pressure to be introduced into the pressure chamber can be controlled by a valve means incorporating an electromagnetic actuator having open and closed states, the ratio of the open/close time being controlled by the duty cycle of an applied control signal.

What is claimed is:

1. A slip-limit control system for a limited-slip differential gear unit, comprising:
   a slip-limit adjusting means, incorporated in said limited-slip differential gear unit, for producing a controlled magnitude of slip-limiting torque according to a differential control signal so as to adjust driving torque distribution for left and right wheels;
   a first sensor means for monitoring a vehicle driving condition to produce a first sensor signal indicative of a preselected slip control parameter;
   a second sensor for monitoring a suspension mode of an adjustable suspension system which has variable suspension characteristics, to produce a second sensor signal indicative of the suspension mode; and
   a controller being preset with a plurality of differential control characteristics corresponding to different magnitudes of slip-limiting torque for different driving torque distributions, said controller being responsive to said first sensor signal to derive said differential control signal based thereon according to one of said differential control characteristics, and said controller being responsive to said second sensor signal to select one of said differential control characteristics depending upon the suspension mode of said adjustable suspension system.

2. A slip-limit control system as set forth in claim 1, wherein said adjustable suspension system has variable suspension characteristics at least between a HARD and a SOFT mode, and said controller selects a first differential control characteristics when said adjustable suspension system operates in said HARD mode and selects a second differential control characteristics in which a lower slip-limitation is provided than that in said first differential control characteristics, when said adjustable suspension system operates in said SOFT mode.

3. A slip-limit control system as set forth in claim 1, wherein said slip-limit adjusting means comprises a hydraulic clutch assembly having an adjustable engaging pressure and a hydraulic actuator associated with said hydraulic clutch for adjusting said engaging pressure for controlling said slip-limiting torque.

4. A slip-limit control system as set forth in claim 3, wherein said hydralic clutch assembly comprises a first clutch interposed between an input shaft of the limited-slip differential gear unit and a first output shaft for driving said left wheel and a second clutch interposed between said input shaft and a second output shaft for driving said right wheel, and said first and second clutches are operatively connected with said hydraulic actuator for adjustment of said engaging pressure.

5. A slip-limite control system as set forth in claim 4, wherein said hydraulic actuator comprises a piston exerting pressure for said first and second clutches for establishing said engaging pressure and a valve means for adjusting fluid pressure exerted on said piston, said valve means adjusting said fluid pressure according to said differential control signal.

6. A slip-limit control system as set forth in claim 5, wherein said valve means is connected to a fluid pressure source including a fluid pump controlled by said controller.

7. A slip-limit control system as set forth in claim 6, wherein said fluid pump is controlled to be driven only in a predetermined vehicle driving condition which requires differential operation.

8. A slip-limit control system as set forth in claim 7, wherein said first sensor means monitors a vehicle speed and produces a vehicle speed indicative first sensor signal, and said controller derives said differential control signal based on a value of said vehicle speed indicative first sensor signal.

9. A slip-limit control system as set forth in claim 8, wherein said first sensor means also monitors an acclerator position and produces an accelerator position indicative first sensor signal, and said controller derives said differential control signal based on said vehicle speed indicative first sensor signal and said accelerator position indicative first sensor signal.

10. In an adjustable slip-limit limited-slip differential gear unit which produces a slip-limiting torque which is adjustable according to a vehicle driving condition, a method for controlling a slip-limitation for said limited-slip differential gear unit comprising the steps of:
    providing a slip-limit adjusting means in said limited-slip differential gear unit for producing a slip-limiting torque for adjusting driving torque distribution for associated left and right wheels;
    monitoring preselected differential control parameter for producing a first signal indicative thereof;
    detecting an operation mode of an adjustable suspension system for producing a suspension mode indicative second signal;
    selecting one of a plurality of mutually different preset differential control characteristics based on said second signal; and
    deriving a differential control signal according to a given differential control characteristics based on said first signal for controlling said slip-limit adjusting means, said differential control characteristics having first been selected on the basis of said second signal.

11. A method as set forth in claim 10, in which a vehicle speed and an accelerator position are monitored as said differential control parameters.

12. A method as set forth in claim 10, in which operation said and mode of said adjustable suspension system vaires between a HARD mode and SOFT mode, and a first differential control characteristics is selected when said adjustable suspension system is in said HARD mode and a second differential control characteristics which produces a lower slip-limiting torque than that of said first differential control characteristics, is selected when said adjustable suspension system is in said SOFT mode.

13. A slip-limit control system for a limited-slip differential gear unit, comprising:
a slip-limit adjusting means, incorporated in said limited-slip differential gear unit, for producing a controlled magnitude of slip-limiting torque according to a differential control signal so as to adjust driving torque distribution for left and right wheels;
a first sensor means for monitoring a vehicle driving condition to produce a first sensor signal indicative of a preselected slip control parameter;
a second sensor for monitoring a suspension mode of an adjustable suspension system which has a variable suspension characteristic at least between a softer suspension mode and a harder suspension mode, to produce a second sensor signal indicative of the suspension mode; and
a controller being preset with a plurality of differential control characteristics corresponding to different magnitdues of slip-limiting torque for different driving torque distributions, said controller selecting one of said differential control characteristics on the basis of said second sensor signal so that slip-limit of said differential gear unit is decreased when said second sensor signal is indicative of a softer suspension mode and slip limit of said differential gear unit is increased when said second sensor signal is indicative of a harder suspension mode, said controller responsive to said first sensor signal to derive said differential control signal based thereon according to the selected one of said differential control characteristics.

14. In an adjustable slip-limit limited-slip differential gear unit which produces a slip-limiting torque which is adjustable according to a vehicle driving condition, a method for controlling a slip-limitation for said limited-slip differential gear unit comprising the steps of:
presetting a plurality of differential control characteristics which are selected in terms of an operation mode of an adjustable suspension system which has a variable suspension characteristics at least between a first softer suspension mode and a second harder suspension mode, said differential control characteristics including a first differential control characteristics corresponding to a smaller slip-limit, which first differential control characteristics is selected when said adjustable suspensio system is operating in said first, softer suspension mode, and a second differential control characteristics corresponding to a greater slip-limit, which second differential control characteristics is selected when said adjustable suspension system is operating in said second, harder suspension mode;
providing a slip-limit adjusting means in said limited slip differential gear unit for producing a sliplimiting torque for adjusting driving torque distribution for associated left and right wheels;
monitoring pre-selected differential control parameter for producing a first signal indicative thereof;
detecting said operation mode of an adjustable suspension system for producing a suspension mode indicative second signal;
selecting said first and second differential control characteristics based on said second signal; and
deriving a differential control signal according to one of said plurality of differential control characteristics based on said first signal, for controlling said slip-limit adjusting means said one differential control characteristic having been selected on the basis of said second signal.

* * * * *